United States Patent
Shneyour et al.

(10) Patent No.: US 7,277,411 B2
(45) Date of Patent: Oct. 2, 2007

(54) METHOD AND SYSTEM FOR TRANSMITTING AND RECEIVING DATA IN A TDMA FREQUENCY HOPPING SYSTEM UTILIZING FREQUENCY DIVERSITY

(75) Inventors: Ofer Shneyour, Hod Hasharon (IL); Guy Ben-Artzi, Zichron Yaacov (IL); Levi Schultz, Hashmonaim (IL); Yaron Naim, Herzeliya (IL); David Cohen, Ashdod (IL)

(73) Assignee: D.S.P. Group Ltd., Herzeliya, Pituach (IL)

( * ) Notice: Subject to any disclaimer, the term of this patent is extended or adjusted under 35 U.S.C. 154(b) by 1177 days.

(21) Appl. No.: 10/226,073

(22) Filed: Aug. 21, 2002

(65) Prior Publication Data

US 2004/0037251 A1    Feb. 26, 2004

(51) Int. Cl.
*H04J 3/00* (2006.01)
(52) U.S. Cl. ................................ 370/337; 370/347
(58) Field of Classification Search ................ 370/328, 370/329, 330, 337, 341, 343, 344, 431, 442, 370/436; 375/132
See application file for complete search history.

(56) References Cited

U.S. PATENT DOCUMENTS

| | | | |
|---|---|---|---|
| 4,642,806 A * | 2/1987 | Hewitt et al. | 370/347 |
| 4,799,252 A * | 1/1989 | Eizenhoffer et al. | 370/330 |
| 4,868,811 A * | 9/1989 | Suzuki | 370/436 |
| 5,134,615 A | 7/1992 | Freeburg et al. | |
| 2004/0248583 A1* | 12/2004 | Satt et al. | 455/452.2 |

FOREIGN PATENT DOCUMENTS

WO    WO 94/03002    2/1994

* cited by examiner

*Primary Examiner*—Ajit Patel
(74) *Attorney, Agent, or Firm*—The Nath Law Group; Jerald L. Meyer; Matthew J. Moffa

(57) ABSTRACT

Data is transmitted and received in a TDMA frequency hopping system by allocating two or more time slots for transmitting identical data packets, and transmitting the identical data packets in the allocated time slots at different frequencies. This requires the transmission of redundant information but reduces the likelihood of data loss. An adaptive scheme may be employed wherein more time slots are allocated for the repeated data transmissions in areas of poor reception while fewer time slots are allocated for the repeated data transmissions in areas of higher quality reception or when higher bandwidth is required.

10 Claims, 5 Drawing Sheets

METHOD AND SYSTEM FOR TRANSMITTING AND RECEIVING DATA IN A TDMA FREQUENCY HOPPING SYSTEM UTILIZING FREQUENCY DIVERSITY

FIELD OF THE INVENTION

This invention relates to improvement of communications quality in a frequency agile system.

BACKGROUND OF THE INVENTION

TDMA (Time Division Multiple Access) is a method of digital wireless communications transmission allowing a large number of users to access a single radio-frequency channel without interference. A unique time slot is allocated to each user within each channel. Thus although the multiple users transmit and receive at a common frequency, there is no danger of collision because their respective transmissions are separated in time.

Frequency hopping is a technique where a transmitter and receiver alter frequency in synchronism with each other so that different data packets may be transmitted at different frequencies. Frequency hopping has obvious military and security applications since it is difficult for an eavesdropper to intercept a transmission for sufficient time to obtain useful information, before the transmitter frequency changes and the eavesdropper is no longer able to intercept the transmission. However, even apart from such consideration, frequency hopping is useful to minimize the risk of data loss owing to a frequency jam, since the larger the number of different frequency channels used to convey different data packets, the smaller is the number of data packets that may become lost if a specific frequency channel suffers from noise or becomes blocked.

WO 9403002 entitled "*Frequency hopping time-diversity communications systems and transceivers for local area networks*" discloses a system utilizing adaptive frequency-hopped spread spectrum modulation to communicate over noisy communications channels. Individual packets of data are transmitted with FSK modulation using two frequencies chosen from a larger set. An error coding system is used in which data on the quality of reception at each network transceiver is used to alter the gain of the receiver, the bit rate of the transmission, and the specific frequencies employed by the network for the purpose of optimizing communication error rate.

Communication systems must employ a communications protocol that handles transmission errors. Typically, the receiver sends an acknowledge signal to the transmitter on correct receipt of a data packet and the receiver awaits receipt of the acknowledge signal before sending the next packet. When frequency hopping is used, the retransmission of the same data packet may be at a different frequency and this may well improve the quality of transmission if the previous transmission were lost owing to a noisy or otherwise blocked channel. However, in TDMA systems, the "faulty" data packet is re-transmitted during the same time slot since it must be conveyed along the same channel and the TDMA time-slot defines which channel is associated with a given transmission. TDMA systems endeavor to pack in as many time slots as possible, since this increases the number of data channels and makes the most efficient use of bandwidth.

In summary, TDMA allows data packets belonging to different transmissions to be conveyed in different time slots at a single frequency; and frequency hopping allows data packets belonging to the same transmission to be conveyed at different frequencies. U.S. Pat. No. 5,134,615 (Freeburg et al.) entitled "*Frequency agile TDMA communications system*" published Jul. 28, 1992 discloses a TDMA system wherein different time slots are associated with different frequencies so as to permit the system to be compatible with different communications protocols operating at different transmission frequencies.

There appears to be no suggestion in the art to use frequency hopping in a TDMA system for reducing data loss and improving throughput.

SUMMARY OF THE INVENTION

It is therefore an object of the present invention to provide a TDMA system wherein frequency hopping is used to reduce data loss and improve throughput.

This object is realized in accordance with a first aspect of the invention by a method of transmitting data in a TDMA frequency hopping system, the method comprising:
 (a) allocating at least two time slots for transmitting identical data packets, and
 (b) transmitting said identical data packets in the at least two time slots at different frequencies.

A complementary method of receiving data in a TDMA frequency hopping system, comprises:
 (a) receiving in at least two time slots data packets transmitted at different frequencies, and
 (b) selecting one of the data packets based on reception quality.

A TDMA frequency hopping system, comprises:
 a transmitter configurable to allocate at least two time slots for transmitting identical data packets, and to transmit said identical data packets in the at least two time slots at different frequencies, and
 a receiver configurable to receive in at least two time slots data packets transmitted at different frequencies, and to select one of the data packets based on reception quality.

The invention thus uses frequency hopping in a TDMA system to transmit identical data packets in different time slots at different frequencies, so that if one of the transmissions is garbled, at least one the repeated transmissions at a different frequency and time slot will likely be received properly. It is counter-intuitive to allocate multiple time slots to different frequencies in a TDMA system in order to reduce the likelihood of data loss since this also militates against conventional wisdom, which attempts to maximize the number of TDMA time slots so as to increase the number of different channels.

The invention allocates at least one backup time slot for transmitting identical data packets and uses frequency hopping to transmit the data in each of the two or more time slots so as to render it most unlikely that one of the data packets is not received intact. This comes at a price: namely that maximum throughput is reduced. On the other hand, the signal intensity may be increased since in most cases identical data packets are received in adjacent time slots at different frequencies. The effects of noise are generally random and so will affect the two (or more) data packets differently. This allows the receiver to use the highest quality transmission and to use compensation techniques to remove noise. Thus, the invention mitigates the effects of frequency selective multi-path fading and of jamming signals (i.e. other intentional emitters), which in general are frequency dependent.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
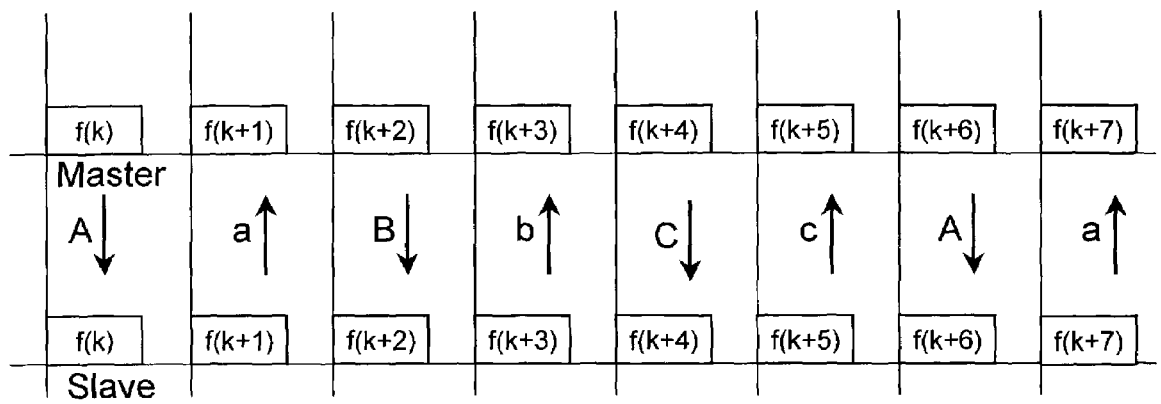
FIG. 1 shows graphically a data communications protocol using frequency hopping in a TDMA system according to the invention.

Referring to FIG. 1, there is shown graphically TDMA time slots in a communications protocol for communicating between a master and slave. Thus, in a first time slot, a data packet "A" is conveyed at a first frequency f(k) from the master to the slave and the slave responds during a second time slot by sending a data packet "a" at a frequency f(k+1). Subsequent time slots are likewise allocated at frequencies f(k+2) to f(k+5) for conveying successive data packets between master and slave and vice versa, as shown in the figure.

The data packet "A" is conveyed a second time at a second frequency f(k+6) from the master to the slave and the slave responds during a second time slot by sending the data packet "a" at a frequency f(k+7).

Thus, identical data packets are conveyed from the master to the slave and from the slave to the master during different TDMA time slots at different frequencies. For the sake of example, frequency hopping is applied between all TDMA time slots such that data is transmitted from the master to the slave at a first frequency and the slave responds in a successive TDMA time slot at a different frequency. However, this is not essential and the data packets "A" and "a" could be conveyed during different TDMA time slots at the same frequency. What is significant, so far as the invention is concerned, is that repeated transmissions of the data packets "A" and "a" must be at different frequencies to the original frequencies.

Figure 2:
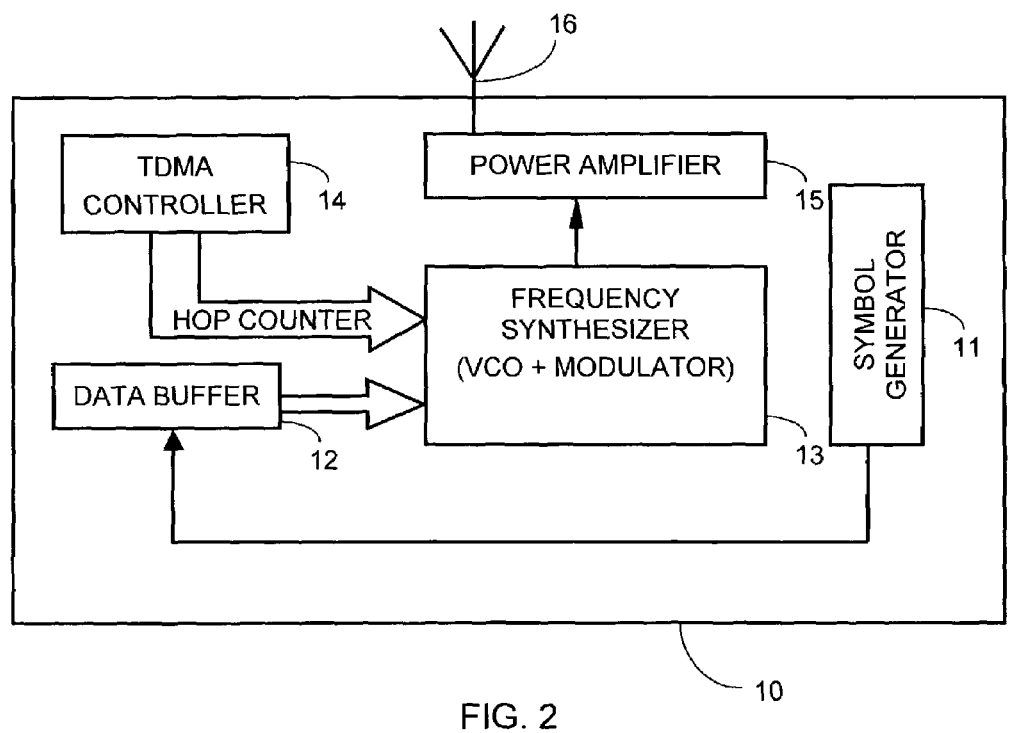
FIG. 2 is a block diagram showing functionally a transmitter configured to operate according to the data communications protocol shown in FIG. 1.

FIG. 2 is a block diagram showing functionally a transmitter 10 configured to operate according to the data communications protocol shown in FIG. 1. The transmitter 10 comprises a symbol generator 11, which feeds data that is to be transmitted to a data buffer 12. The data buffer 12 feeds the data to a frequency synthesizer 13 comprising a voltage controlled oscillator and modulator for modulating the data with a carrier frequency. The frequency synthesizer 13 is responsive to a hop counter fed by a TDMA controller 14 for varying the carrier frequency. The hop counter operates in conjunction with a hop list that contains a list of different carrier frequencies that are selected successively, the hop counter serving to point to a different item in the list. By this means, data packets stored in the data buffer 12 may be modulated at different carrier frequencies, amplified by a power amplifier 15 coupled to the frequency synthesizer 13 and transmitted via an antenna 16 to a receiver 20 shown in FIG. 3 during different TDMA time slots.

When the data buffer 12 receives new data packets from the symbol generator 11 it latches the data so as to allow the TDMA controller 14 to feed different hop counters to the frequency synthesizer 13 and allow the same data packets to be modulated with different carrier frequencies and transmitted during different TDMA time slots. The identical data packets are not necessary transmitted during sequential TDMA time slots although they could be. It makes no difference since each data packet is identified and the receiver is able to reconfigure the incoming data packets in correct order in known manner.

Figure 3:
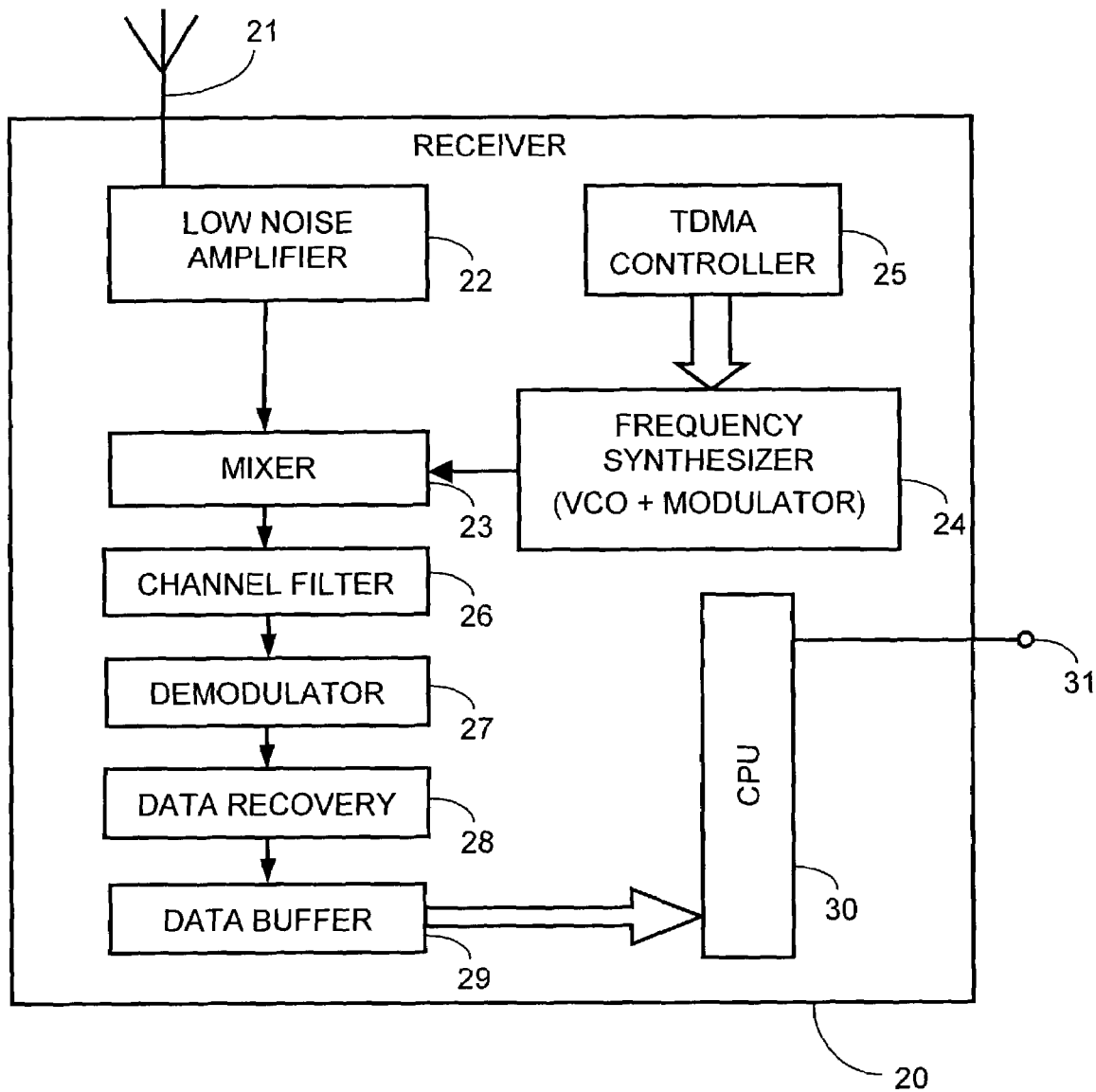
FIG. 3 is a block diagram showing functionally a receiver configured to operate according to the data communications protocol shown in FIG. 1.

FIG. 3 is a block diagram showing functionally the receiver 20, comprising an antenna 21 for receiving the signal transmitted by the transmitter 10. A low noise amplifier 22 coupled to the antenna 21 amplifies the received signal and feeds it to a mixer 23, which is responsive to the carrier signal used for the current TDMA slot and fed thereto by a frequency synthesizer 24 for mixing the received signal with a specific carrier signal corresponding to one specific TDMA time slot. It will be understood that the received signal contains successive data packets that are modulated and transmitted at different carrier frequencies. Therefore, in order to receive a specific data packet transmitted at a respective frequency, the incoming signals must be stripped of all extraneous signals transmitted at different frequencies. This is done by mixing the received signal with a carrier signal having a frequency corresponding to the carrier signal of the TDMA slot whose data is to be decoded. The carrier signal is produced by a frequency synthesizer 24, which is responsive to a hop counter generated by a TDMA controller 25 that is synchronized to the TDMA controller 14 in the transmitter. An identical hop list is stored in the receiver, so that successive TDMA time slots may be decoded in roper time and frequency synchronism with the transmitter. The TDMA controller 25 thus feeds the correct hop counter for the current TDMA time slot to the frequency synthesizer 24, thus ensuring that the signal produced by the frequency synthesizer 24 is the same as the carrier signal for the current TDMA time slot. The signal produced by the frequency synthesizer 24 is fed to the mixer 23, which mixes it with the amplified incoming signal containing multiple frequency signals, transmitted at different carrier signals. The mixer 23 heterodynes the incoming signal frequency to that of the frequency synthesizer 24 so as to produce an intermediate signal having a predetermined fixed frequency that is passed by the cannel filter 26, thus making subsequent channel filtering easier to implement.

The mixed signal is fed to a channel filter 26 that passes only the heterodyned modulated signal pertaining to the current TDMA time slot. This is demodulated by a demodulator 27, which is coupled to a data recovery unit 28 that recovers the original signal transmitted during the current TDMA time slot and stores it in a data buffer 29. The data buffer 29 feeds the signal to a CPU 30 coupled to an output 31 of the receiver. The CPU 30 selects which of the identical data packets to use based on the CRC (i.e. parity check) and signal strength. By such means, even in those cases where there is no channel loss and data is recovered in both time slots, the quality of reception may be improved.

It will be appreciated that the use of the mixer 23 allows each tuned carrier frequency to be converted to a single fixed intermediate frequency thereby allowing use of a channel filter that is tuned to a single frequency corresponding to that of the intermediate frequency. This scheme is used since it is more difficult to produce a filter with good selectivity which can be tuned over a frequency range. It is much easier to use a fixed filter and tune a local oscillator. However, use of the mixer 23 is only an exemplary implementation of the invention and could be dispensed with if the channel filter 26 were a sufficiently highly selective variable tuned filter.

The demodulator 27 recovers the raw data bits modulated on the filtered carrier signals in each TDMA slot. There are many ways to implement this depending on the modulation scheme used (i.e. FSK, PSK, PAM etc.). In any case the type of modulation used or the manner in which demodulation is implemented is not a feature of the invention. A preferred embodiment reduced to practice, utilizes FSK modulation, and a frequency discriminator/data slicer demodulation scheme. The data recovery unit 28 concatenates the demodulated data received in successive TDMA time slots so as to recover the original signal.

Figure 4:
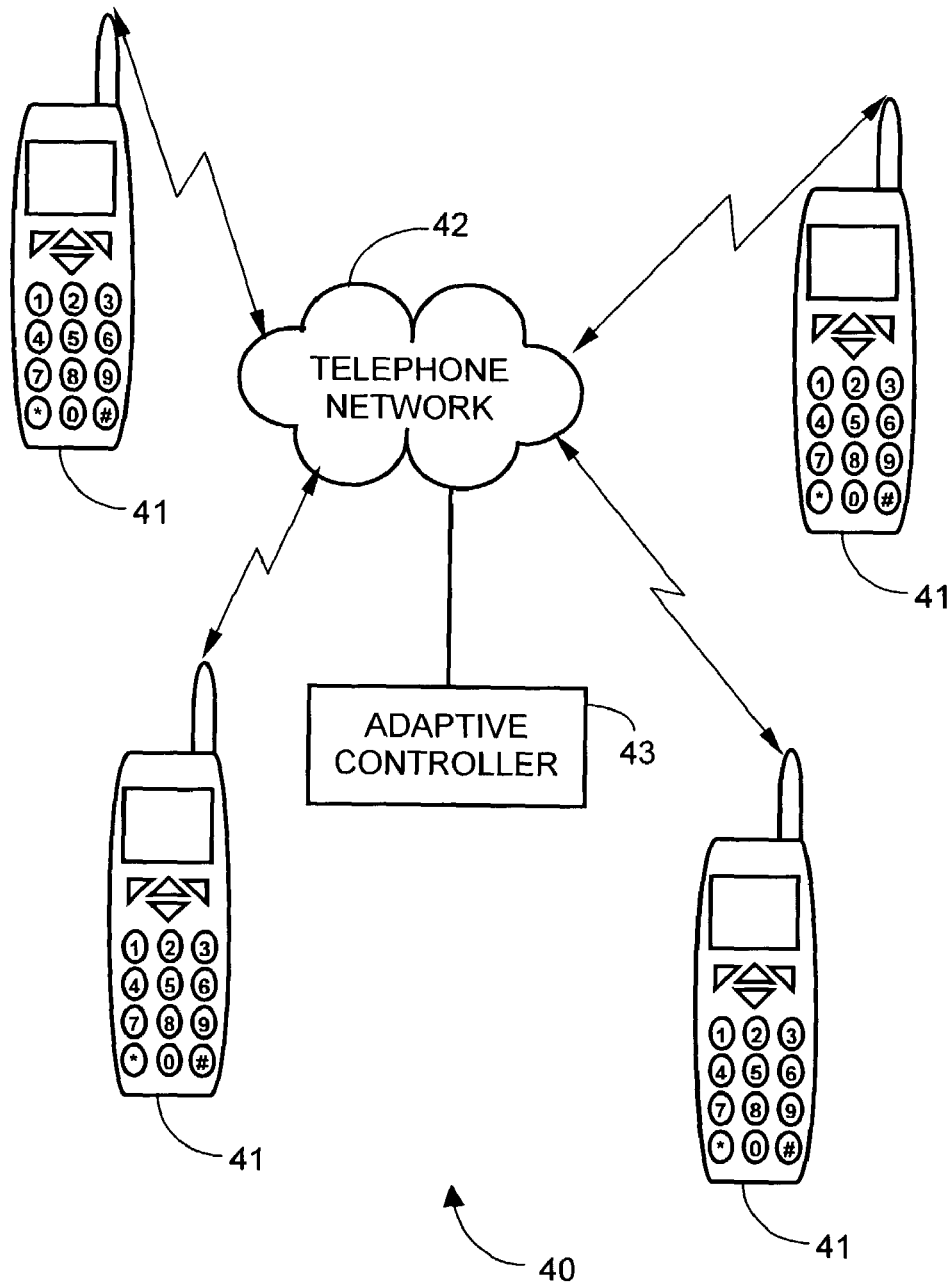
FIG. 4 is a schematic representation of a multi-handset cordless telephony system according to the invention.

FIG. 4 shows schematically an implementation of the invention being a multi-handset cordless telephony system designated generally as 40 comprising multiple cordless telephone handsets 41 that transmit and receive via a telephone network 42. In such a system at different times, a variable number of handsets 41 are utilized and the data rate is thus variable depending on the number of handsets that are simultaneously transmitting. and multi slot transmission is utilized only when the system is operated at less than 50% of the available data bandwidth. Thus there is enough bandwidth to transmit every slot twice at two different frequencies. Once the system requires more than 50% of the available bandwidth, the multi slot scheme is dropped. As an example, in a multi-handset cordless telephony system, capable of supporting four handsets over four TDMA time slots, the retransmission scheme is utilized when one or two handsets are in use.

To this end, an adaptive controller 43 is connected to the telephone network 42 for determining whether there is sufficient bandwidth to invoke the transmission method of the invention and for reducing the number of TDMA time slots allocated for multiple transmissions of identical data packets if there is insufficient bandwidth.

The adaptive controller 43 may also be configured to respond to reception quality for reducing the number of TDMA time slots allocated for multiple transmissions of identical data packets in areas of such high reception quality that transmission redundancy may safely be reduced or dispensed with. Alternatively, in areas of particularly low reception quality, the adaptive controller 43 may allocate more than two TDMA time slots for the transmission of identical packets at different frequencies where bandwidth considerations allow for this. Likewise, when higher data bandwidth is required, the adaptive controller 43 may be configured to reduce the number of TDMA time slots allocated for multiple transmissions of identical packets at different frequencies.

Figure 5:
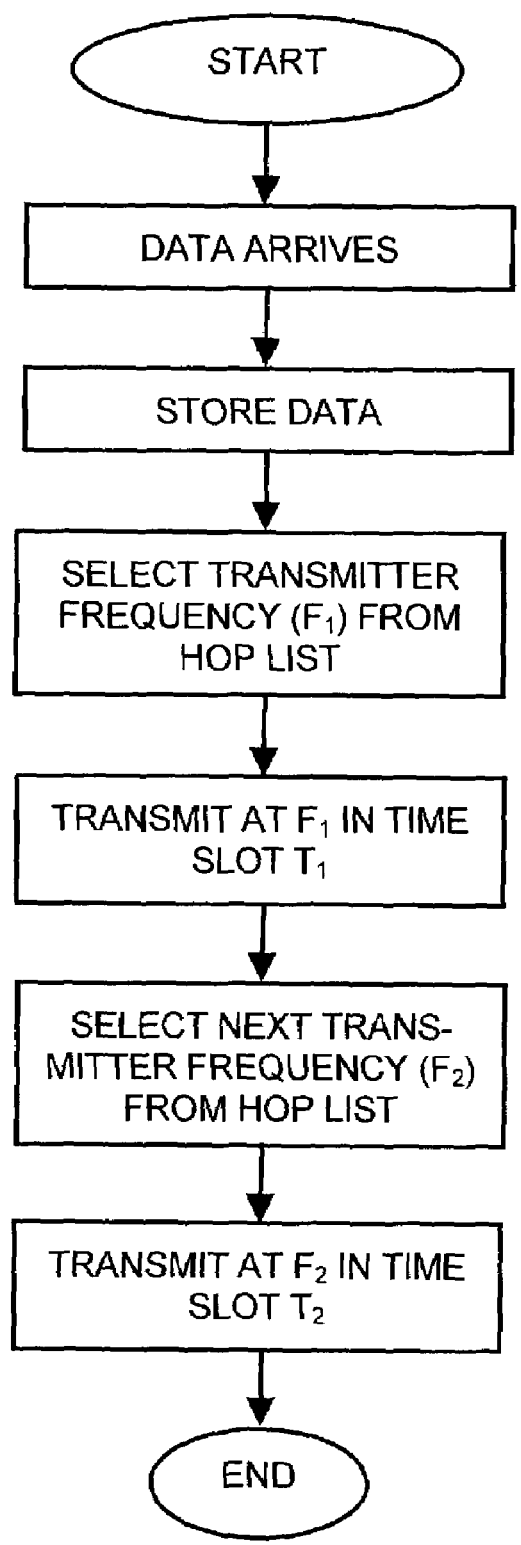
FIG. 5 is a flow diagram showing the principal operations carried out by the transmitter shown in FIG. 2.

FIG. 5 is a flow diagram showing the principal operations carried out by the transmitter 10 shown in FIG. 2. Thus data arrives from the symbol generator, is stored and a first carrier frequency $F_1$ is selected from the hop list as explained above. The data is modulated at the selected carrier frequency $F_1$ and transmitted during the TDMA time slot $T_1$. A second carrier frequency $F_2$ is selected from the hop list and the same data is modulated with the second carrier frequency $F_2$ and transmitted during a second TDMA time slot $T_2$. As noted above, the TDMA time slots used to convey the identical data packets may or may not be sequential.

Figure 6:
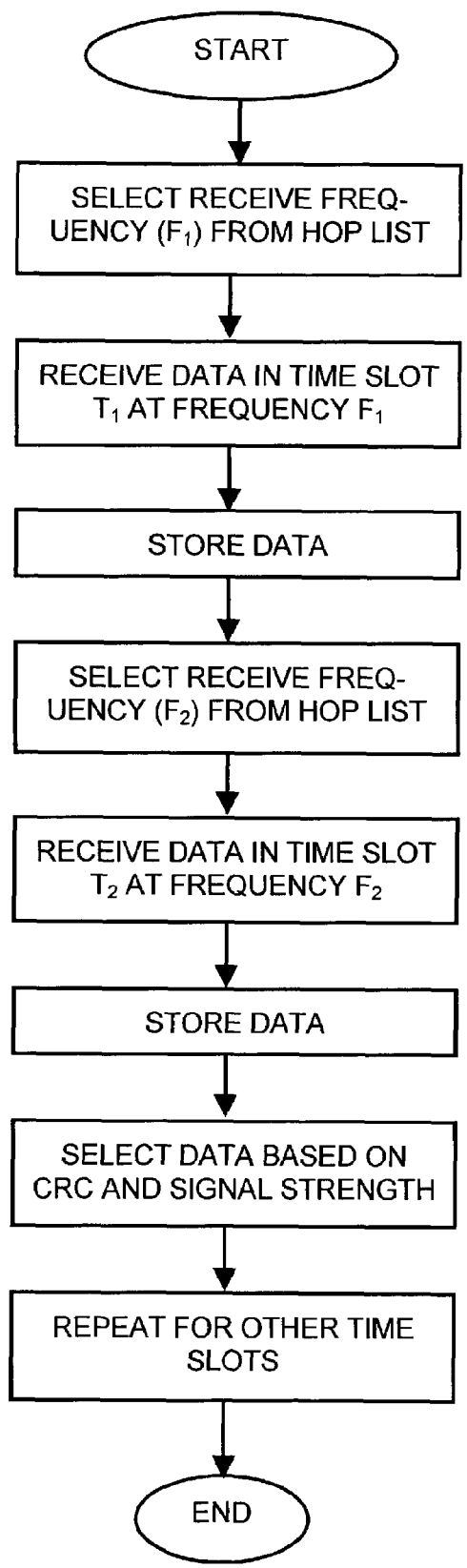
FIG. 6 is a flow diagram showing the principal operations carried out by the receiver shown in FIG. 3.

FIG. 6 is a flow diagram showing the principal operations carried out by the transmitter shown in FIG. 3. The receiver 20 performs a procedure that is complementary to that carried out by the transmitter 10. Thus, it receives the carrier frequency $F_1$ from the hop list and receives data in the first TDMA time slot $T_1$. The data is demodulated and stored. In similar manner, the receiver receives the carrier frequency $F_2$ from the hop list and receives the identical data in the second TDMA time slot $T_2$. The data is demodulated and stored. The CPU selects which of the identical data packets to use based on reception quality as indicated by the CRC (i.e. parity check) and signal strength and the same procedure is repeated for other TDMA time slots.

While the invention has been described with particular application to the use of two TDMA for transmitting and receiving identical data packets modulated at different carrier frequencies, it will be appreciated that the same principles may be applied for conveying identical data packets during more than two TDMA time slots. As noted above, this may be desirable, for example, in areas of poor transmission and reception quality. Conversely, in areas of high reception quality where data is found to be reliably received in all TDMA time slots or when higher data bandwidth is required, the redundancy inherent in multiple transmissions of the same data packets can be reduced.

The invention claimed is:

1. A TDMA frequency hopping system, comprising:
a transmitter configurable to allocate at least two time slots for transmitting identical data packets, and to transmit said identical data packets in the at least two time slots at different frequencies, and
a receiver configurable to receive in at least two time slots data packets transmitted at different frequencies, and to select one of the data packets based on reception quality; said receiver comprising:
a channel filter responsively coupled to a TDMA controller for filtering an incoming signal comprising multiple data packets each received in a respective TDMA slot and superimposed on a carrier signal having a respective frequency
a demodulator coupled to the channel filter for demodulating the filtered incoming signal to as to produce each of the data packets received in successive TDMA slots, and
a data recovery unit coupled to the demodulator for concatenating the demodulated data packets received in successive TDMA time slots so as to recover the transmitted signal;
said channel filter comprising:
a frequency synthesizer responsive to a hop counter for producing for each TDMA slot a carrier frequency that is identical to the carrier frequency used by the transmitter to transmit data during the respective TDMA slot,
a TDMA controller synchronized to the transmitter for generating said hop counter so that successive TDMA time slots are decoded in proper time and frequency synchronism with the transmitter, and
a mixer for mixing the carrier frequency produced by the frequency synthesizer with the incoming signal containing multiple frequency signals, transmitted at different carrier signals so as to produce an intermediate signal having a predetermined frequency.

2. The TDMA frequency hopping system according to claim 1, wherein the transmitter comprises:
a symbol generator for generating data that is to be transmitted, a data buffer coupled to the symbol generator for buffering the data and feeding the data to a frequency synthesizer and modulator that modulates the data with a carrier frequency, and a TDMA controller coupled to the frequency synthesizer for varying the carrier frequency so as to transmit identical data in different TDMA slots at different frequencies.

3. The TDMA frequency hopping system according to claim 2, wherein:

the frequency synthesizer is responsive to a hop counter fed by the TDMA controller for varying the carrier frequency, and the hop counter operates in conjunction with a hop list that contains a list of different carrier frequencies that are selected successively, the hop counter serving to point to a different item in the list.

4. The TDMA frequency hopping system according to claim 1, further including an adaptive controller for determining whether there is sufficient bandwidth for multiple transmissions of identical data packets and for reducing a number of allocated TDMA time slots for multiple transmissions of identical data packets if there is insufficient bandwidth.

5. The TDMA frequency hopping system according to claim 1, further including an adaptive controller that is responsive to reception quality for reducing a number of allocated TDMA time slots for multiple transmissions of identical data packets in areas where reception quality allows for transmission redundancy to be reduced.

6. The TDMA frequency hopping system according to claim 4, wherein the adaptive controller is responsive to reception quality for allocating more TDMA time slots for the transmission of identical packets at different frequencies in areas of poor reception quality where bandwidth considerations allow for this.

7. The TDMA frequency hopping system according to claim 1, being a multi-handset cordless telephony system wherein multiple transmitters and receivers are provided in respective telephone handsets.

8. The TDMA frequency hopping system according to claim 4, being a multi-handset cordless telephony system wherein multiple transmitters and receivers are provided in respective telephone handsets.

9. The TDMA frequency hopping system according to claim 5, being a multi-handset cordless telephony system wherein multiple transmitters and receivers are provided in respective telephone handsets.

10. The TDMA frequency hopping system according to claim 6, being a multi-handset cordless telephony system wherein multiple transmitters and receivers are provided in respective telephone handsets.

* * * * *